Oct. 7, 1952

C. G. KRONMILLER 2,613,105

CONTROL DEVICE

Filed Dec. 23, 1948

INVENTOR.
CARL G. KRONMILLER
BY George H Fisher
ATTORNEY

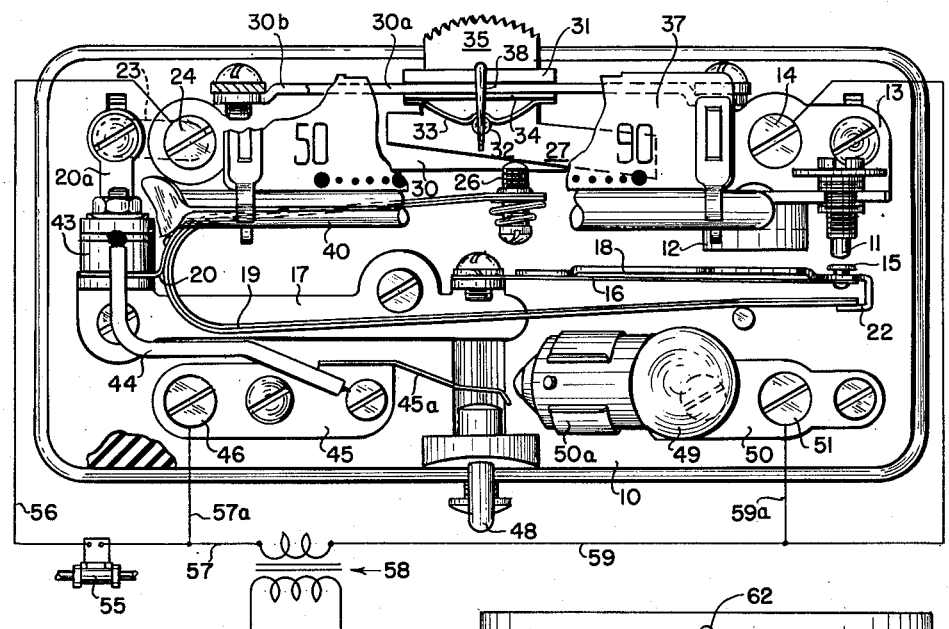
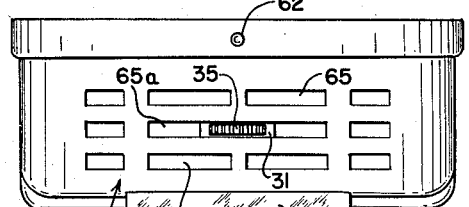
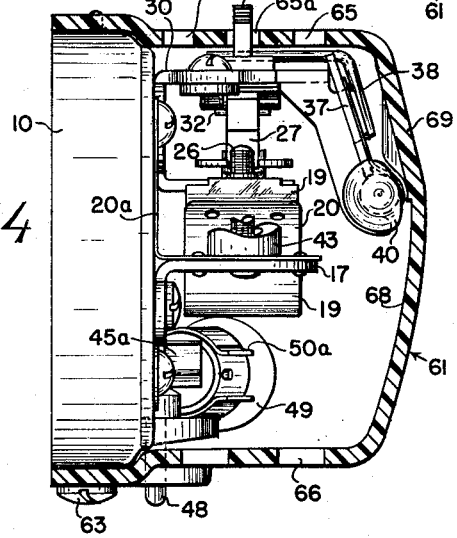

Patented Oct. 7, 1952

2,613,105

UNITED STATES PATENT OFFICE 2,613,105

CONTROL DEVICE

Carl G. Kronmiller, Edina, Minn., assignor to Minneapolis-Honeywell Regulator Company, Minneapolis, Minn., a corporation of Delaware Application December 23, 1948, Serial No. 67,008

3 Claims. (Cl. 297—11)

This invention is directed to condition responsive control devices and more particularly to adjusting means for such devices.

It is an object of the invention to provide an adjusting mechanism for a condition responsive device, such as a room thermostat, in which the control temperature is adjusted by manually positioning a slidable member that extends through an opening in the instrument cover.

Another object is to provide a room thermostat or similar control device in which the base of the instrument carries a bracket on which is mounted a scale plate, a thermometer cooperating with the scale, and an adjusting member which is manually movable in the bracket and is provided with a pointer which cooperates with the same scale. The scale, pointer and thermometer may be visible through a suitable window in the instrument cover and the adjusting member may be constructed with a portion that extends through an opening in the cover to facilitate manual selection of the control temperature.

Another object of the invention is to provide a room mounted control device having a window in the cover through which the condition indicating scale may be viewed, the cover being otherwise opaque to conceal the operating mechanism. This structure may comprise a cover fabricated of transparent material which is coated with opaque material except in the area that overlies the scale.

Other objects will be evident from the written description and appended claims, and from the drawing, in which Figure 1 is a front elevation of a room thermostat incorporating the invention with the cover in place.

Figure 3 is an elevation, similar to Figure 1, but with the cover removed and certain parts broken away.

Figure 4 is an elevation as seen from the left of Figure 3 with the cover in place but shown in section.

Figure 5 is a plan view of the device with the cover in place, and

Figure 6 is an enlarged fragmentary section of a portion of the cover including the window that overlies the scale plate.

Figure 1:
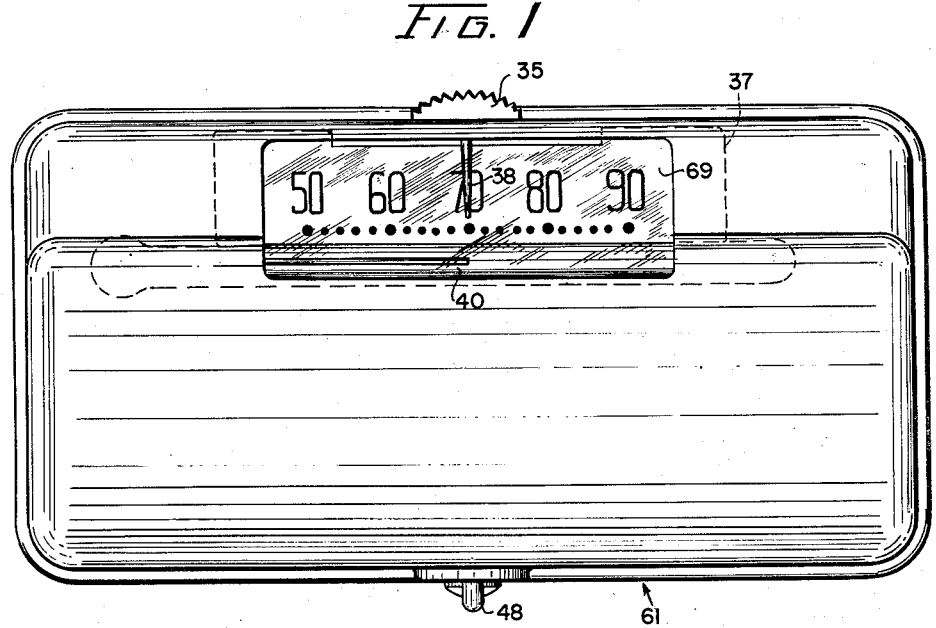

In the illustrative embodiment of the invention the control point of a bimetal actuated thermostat is adjusted by a manually slidable member extending through a slot in the cover of the device. The slot preferably is one of a plurality of openings in the cover provided to permit room air to circulate over the temperature responsive element. The slidable member is guided by a bracket which also carries a scale plate and a thermometer adjacent the front of the cover. A window is provided in the cover through which the thermometer and scale plate together with a pointer positioned by the movable member may be viewed. This arrangement permits a single scale to be used to indicate both selected and actual temperatures without the necessity for accurately correlating the position of parts mounted on the base with respect to the cover as would be the case if either the scale plate or the thermometer or both were carried on the cover. Also, all the operative parts of the device may be assembled on the base and calibrated before the cover is attached. My patent Des. 157,687 is directed to the outward appearance of this thermostat.

The device illustrated in the several figures of the drawing has a base 10 of electrically insulating material adapted to be secured to the wall of a room. As seen in Figure 3, a stationary contact 11 and a permanent magnet 12 are secured to the base by a conducting bracket 13, contact 11 being screw-threaded in the bracket 13 to provide an adjustment of operating differential. The bracket 13 is provided with a terminal screw 14. A movable contact 15, which cooperates with the stationary contact 11 is secured to the right hand end of a spring strip 16, the left hand end of which is secured to a bracket 17 which is fixed to the base 10. A switch arm 18 is secured to the strip 16 adjacent its attachment to the bracket 17, the right hand end of this arm being provided with an opening through which the movable contact 15 extends. When the contacts 11 and 15 are in engagement, the contact carrying end of the spring strip 16 is pressed back from the arm 18 to assure a predetermined minimum pressure between the contacts. This switching mechanism is disclosed in my copending application Serial No. 681,461 filed July 5, 1946, now Patent Number 2,493,294.

A U-shaped bimetal element 19 is pivotally secured to the bracket 17 by a spring strip 20. The lower arm of bimetal element engages an extension 22 of the switch arm 18 in a manner adapted to move the contact 15 out of engagement with contact 11. The switch arm 18 is of magnetic material and is biased by the magnet 12 toward contact closing position. The movable contact 15 is electrically connected by the strip 16, the bracket 17, an extension 20a of the spring strip 20 and a conductor 23 to a terminal screw 24 on the base 10.

The upper leg of the U-shaped bimetal element 19 is provided with an adjustable screw abutment 26 that engages a cam 27 which is horizontally slidable in a bracket 30 to adjustably position the extremity of the upper leg of the bimetal element 19. The strip 20 which supports the bimetal element and the portion of strip 16 which supports switch arm 18 are so formed that the attraction of the magnet 12 for switch arm 18 will maintain the abutment 26 in engagement with cam 27 at all operative conditions of the switch. Hence, the adjusted position of the cam 27 determines the temperature at which the contact 15 will be actuated by the bimetal element.

Figure 2:
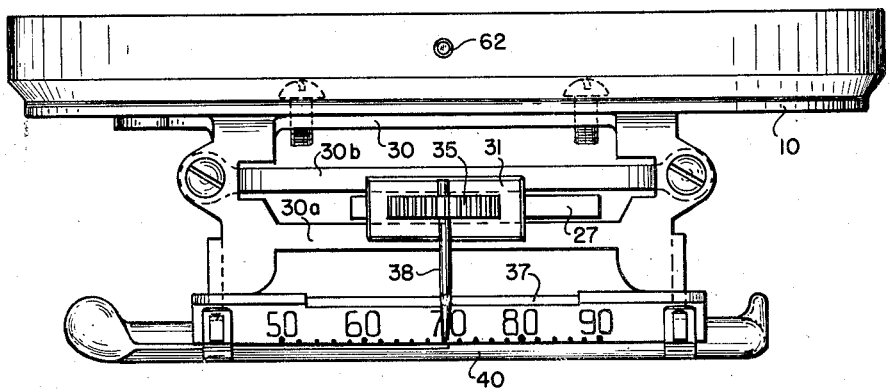
Figure 2 is a plan view of the base and adjusting mechanism of the thermostat, with other parts omitted.

The cam 27 is formed integrally with a member 31 which is carried by a pair of parallel strips 30a and 30b that form a part of bracket 30. The strip is integral with the bracket 30 and strip 30b is secured thereto by a screw at either end. Preferably the openings in the bracket 30 through which the screws pass are somewhat enlarged to permit a small amount of adjustment of the strip 30b with respect to the strip 30a. Cam 27 extends downwardly between the strips and is provided with a pin 32 that serves as an abutment for a curved spring strip 33 which exerts an upward force on a friction plate 34 that engages the underside of the parallel strips 30a and 30b. A manually positionable knob 35 is integral with the member 31 and cam 27 and serves to position cam 27 to the right or left as seen in Figures 2 and 3. The bracket 30 also carries a scale plate 37 having indicia of temperature thereon. A pointer 38, which is movable with the cam 27 cooperates with the indicia on the scale plate 37 to indicate the control temperature of the thermostat. The thermostat is calibrated by adjusting screw abutment 26 so that the bimetal 19 will actuate the switch at the temperature indicated by the pointer 38 on the scale plate 37. A thermometer tube 40 is also carried by the bracket 30 adjacent the lower edge of the scale plate 37 and cooperates with the indicia thereon to indicate actual room temperature. Scale plate 37 is preferably made of translucent material to facilitate illumination of the indicia thereon as will appear below.

An anticipating heater in the form of graphite cylinder 43 is secured to the bracket 17 and to the strip 20, the arrangement being such that when the heater is energized heat will be conducted through the strip 20 to the bimetal element 19. The upper end of the heater 43 is connected by a conductor 44 to a terminal strip 45 on the base 10. A terminal screw 46 is provided to facilitate external connection. A resilient extension 45a of the terminal strip 45 is adapted to be moved by a button 48 into engagement with the center terminal of a light bulb 49, the conducting base of which is supported by spring fingers 50a of a terminal strip 50 secured to the base 10. The terminal strip 50 is provided with a terminal screw 51.

A typical control circuit has been illustrated in connection with Figure 3 to facilitate understanding of the various parts of the device. A control valve 55, which is adapted to control the supply of heating medium to the room in which the thermostat is located, is connected by a wire 56 to the thermostat terminal 24 and by a wire 57 to the secondary of a transformer 58. The opposite terminal of the transformer secondary is connected by a wire 59 to the thermostat terminal 14. It will be seen that when the thermostat contacts 11—15 are in engagement a circuit will be completed to energize the valve 55 and supply heat to the room. Likewise, when the contacts 11—15 are in engagement the heater 43 will be energized through a wire 57a connected to the terminal screw 46 and thence through the terminal strip 45, conductor 44, heater 43, bracket 17, spring strip 16, contacts 15—11, bracket 13, terminal screw 14 and wire 59 which leads back to the transformer 58. When the button 48 is pressed inwardly to cause the resilient portion 45a of terminal strip 45 to engage the center terminal of the lamp, the transformer will energize the lamp 49 through wires 57 and 57a, terminal strip 45, resilient extension 45a, lamp 49, terminal strip 50, terminal screw 51, a conductor 59a, and the wire 59 to the opposite transformer secondary terminal. The light supplied by the lamp 49 serves to illuminate the scale plate 57 so that the indicia thereon will be visible to permit both the actual room temperature and thermostat setting to be ascertained. It has been found that the best location for a room thermostat is often in a position that affords poor visibility even in the daytime. Likewise, the self contained light source is desirable to facilitate setting a room thermostat at night without turning on the light that supplies general room illumination.

A cover 61, that encloses the various operative parts of the device as well as the scale plate 37 and the thermometer tube 40, is secured to the base 10 by a pin 62 extending from the top of the base and by a screw 63 which is screw-threaded in the lower edge of the base 10 and passes through a slot in cover 61. The cover 61 is provided with a plurality of openings 65 in the top theerof as best seen in Figure 5 and a plurality of openings 66 in the bottom, which openings are provided to permit circulation of room air through the enclosure formed by cover 61 and the base 10 and over the bimetal element 19 and the thermometer tube 40 so that they will accurately follow changes in temperature of the room air. The knob 35 which serves to manually position the cam 27 extends upwardly through an elongated opening 65a in the top of cover 61. This opening 65a is of sufficient length so that cam 27 may be moved through the full range of adjustment permitted by the length of the opening between the strips 30a and 30b of the bracket 30.

The cover 61 is preferably molded of a clear synthetic resin such as Lucite. In order to conceal the mechanism of the thermostat the interior of the cover is coated with a layer of opaque material such as paint 66 over the entire interior surface thereof with the exception of an area overlying the indicia on the scale plate 37. Thus, the opening in the opaque layer provides a window 69 through which the indicia on the scale plate 37 together with the pointer 38 and the thermometer tube 40 may be viewed. In Figure 6 an enlarged section of the portion of the cover overlying the scale plate is shown, the thickness of the opaque layer being somewhat exaggerated for the purpose of illustration. This construction provides a simple way of providing a generally opaque cover together with a window through which the indicia may be viewed. It is merely necessary to mask the window portion of the cover prior to spraying the interior of the cover with a suitable paint. The provision of a transparent window over the scale and pointer prevents aimless tampering with these portions of the device. Likewise, by molding the window portion of the cover integral with the remaining portions thereof, the strength of the cover is materially increased. The cover is sufficiently thin so that it presents an appearance of being made of a material of the color of the paint applied to its inner surface.

While the invention has been described in connection with a bimetal actuated electric switch, it will be apparent that the adjusting means provided would be equally applicable to the other types of thermostats or to other condition responsive devices, as for example, a humidity control. It is not necessary that the condition responsive element itself be adjusted by the cam. An equivalent adjustment could be obtained by changing the position of a normally stationary contact, in which case the thermostatic element would remain in fixed relation to the instrument base.

While the cam has been described as sliding in a bracket attached to the base, and the scale plate has been described as supported by a bracket, it will be apparent that certain phases of the invention would be involved if the base itself was formed to carry these members. Various other modifications will be apparent to those skilled in the art and the scope of the invention therefore is to be limited only by the scope of the appended claims.

I claim as my invention:

1. In a condition control device, a base adapted to be mounted on the wall of a room, a condition responsive means positioned on said base, said condition responsive means having an adjustable portion the position of which determines the control condition value, a bracket on said base having parallel members forming a longitudinal track, a slider carried by said members and movable along the track provided thereby, said track having parallel inner and outer faces, said slider having a manually engageable portion and having a cam operatively engaging the adjustable portion of the condition responsive means, said slider having a rigid track engaging portion movable along the outer faces of the track, said slider also including resilient biasing means engaging the inner faces of the track for holding said rigid track engaging portion firmly against the outer faces of the track forming members, a scale plate bearing indicia of the condition carried by said bracket and arranged parallel to said track, and a pointer carried by said slider and movable along said scale plate.

2. A control device as defined in claim 1 wherein one of said parallel members is readily removable and wherein the rigid track engaging portion of the slider and the cam are unitary.

3. A control device as defined in claim 1 in which an enclosing cover having an outline similar to the base of the control device is arranged over the condition responsive means and is attached to said base, said cover having upper and lower slots, at least one of the upper slots being parallel to said track and arranged so that the manually engageable portion of the slider extends through said one slot, said cover also having a window coextensive with at least a portion of the indicia of said scale plate through which the indicia and the pointer may be observed.

CARL G. KRONMILLER.

REFERENCES CITED

The following references are of record in the file of this patent:

UNITED STATES PATENTS

| Number | Name | Date |
|---|---|---|
| 624,098 | Roesch | May 2, 1899 |
| 1,798,854 | Satchwell | Mar. 31, 1931 |
| 1,873,544 | Clark | Aug. 23, 1932 |
| 1,947,613 | Sawin | Feb. 20, 1934 |
| 2,115,802 | Dann | May 3, 1938 |
| 2,173,083 | Ray | Sept. 12, 1939 |
| 2,279,305 | Drake | Apr. 14, 1942 |
| 2,422,714 | Bigelow | June 24, 1947 |